(12) United States Patent
Thurot

(10) Patent No.: US 7,833,781 B2
(45) Date of Patent: Nov. 16, 2010

(54) MODULAR INSTALLATION FOR COMPOSTING ORGANIC MATERIAL

(75) Inventor: Phillipe Jean Louis Thurot, Saintry (FR)

(73) Assignee: Aces Environnement Developpement, Saintry (FR)

( * ) Notice: Subject to any disclaimer, the term of this patent is extended or adjusted under 35 U.S.C. 154(b) by 1250 days.

(21) Appl. No.: 10/516,189

(22) PCT Filed: May 2, 2003

(86) PCT No.: PCT/FR03/01382

§ 371 (c)(1),
(2), (4) Date: Dec. 27, 2005

(87) PCT Pub. No.: WO03/093198

PCT Pub. Date: Nov. 13, 2003

(65) Prior Publication Data

US 2006/0246579 A1 Nov. 2, 2006

(30) Foreign Application Priority Data

May 3, 2002 (FR) .................................. 02 05582

(51) Int. Cl.
*C12M 1/00* (2006.01)
(52) U.S. Cl. .............. 435/290.1; 435/290.2; 435/290.3; 435/290.4
(58) Field of Classification Search ... 435/290.1–290.4, 435/296.1
See application file for complete search history.

(56) References Cited

U.S. PATENT DOCUMENTS

| | | | | |
|---|---|---|---|---|
| 2,223,257 A | * | 11/1940 | Mallory | 210/205 |
| 2,792,644 A | * | 5/1957 | Nelligan | 34/210 |
| 2,867,521 A | * | 1/1959 | Jeffreys | 71/8 |
| 3,054,602 A | * | 9/1962 | Produman | 261/21 |
| 4,230,676 A | * | 10/1980 | Taylor et al. | 435/290.4 |
| 4,414,335 A | * | 11/1983 | Kipp, Jr. | 435/290.4 |
| 4,869,877 A | * | 9/1989 | Sellew et al. | 435/290.2 |
| 5,387,036 A | * | 2/1995 | Hagen et al. | 366/346 |

(Continued)

FOREIGN PATENT DOCUMENTS

EP 0 451 184 12/1989

*Primary Examiner*—Walter D Griffin
*Assistant Examiner*—Shanta G Doe
(74) *Attorney, Agent, or Firm*—Young & Thompson

(57) ABSTRACT

The invention relates to an installation for composting organic material (1). The inventive installation comprises an assembly of cells (10) in which the organic material (1) is stored for fermentation purposes and a ventilation device (20) which blows or draws air through the organic material (1) that is stored in the aforementioned cells (10), each cell (10) comprising a base slab (11) and partition walls (12). The above-mentioned ventilation device (20) comprises at least one ventilator fan (21), which is equipped with a suction opening (211) and a discharge port (212), and a ventilation duct (22) which connects the suction opening (211) or the discharge port (212) to one or more cells (10). According to the invention, the installation comprises an apron (40) forming the base slabs (11) of the different cells (10), said apron comprising means (41) and reserves (42) which are used to install the partition walls (12) of the cells (10) at different pre-determined positions. As a result, the size of the cells (10) can be altered according to requirements and said optimized installation has also removed the need for any air siphon regardless of the ventilation mode used.

18 Claims, 8 Drawing Sheets

U.S. PATENT DOCUMENTS

Figure 1:
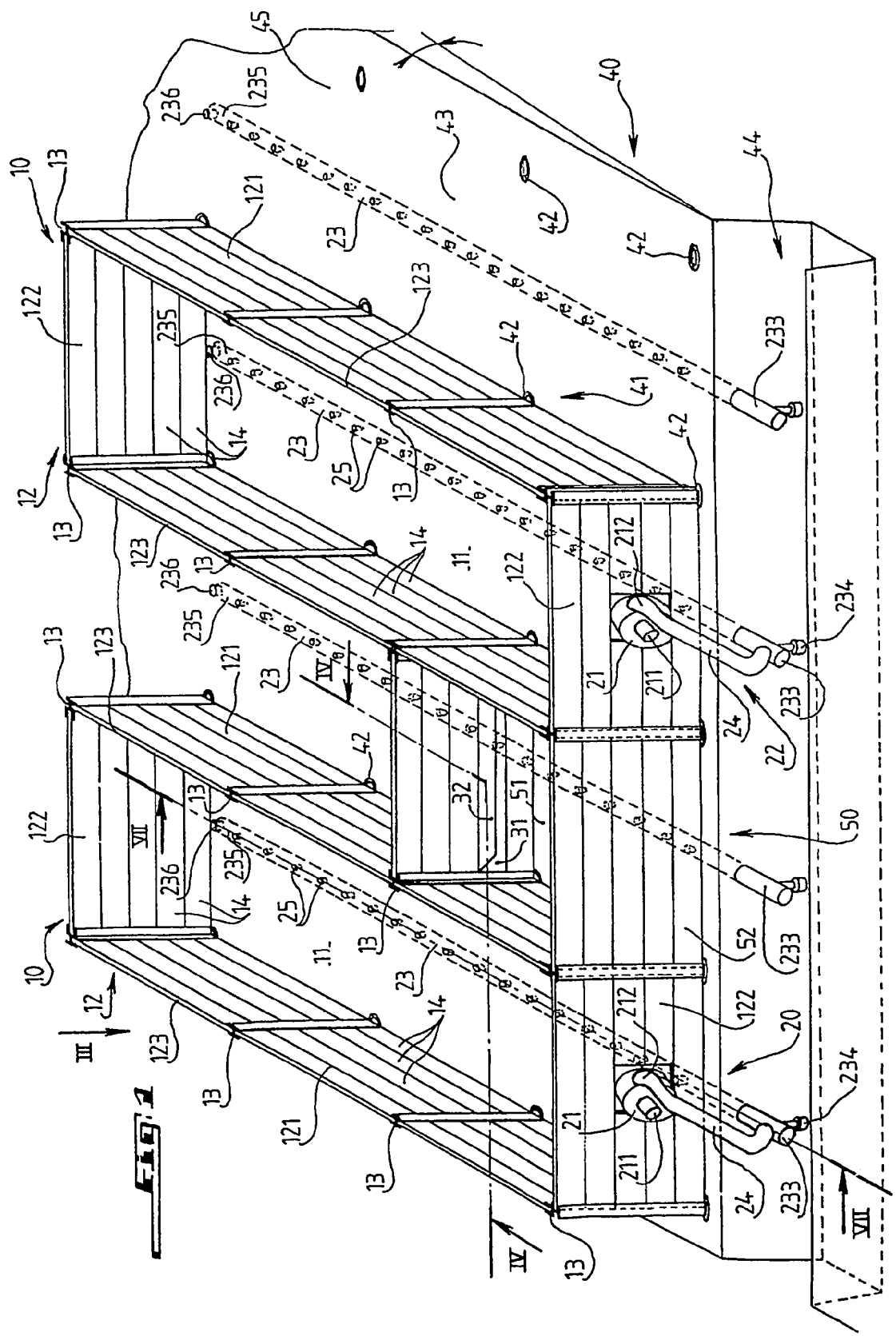

| | | |
|---|---|---|
| 5,628,812 A | 5/1997 | Tempe |
| 6,099,613 A | 8/2000 | Allen et al. |
| 6,383,803 B1 * | 5/2002 | Allen et al. ............. 435/290.1 |
| 6,489,161 B2 * | 12/2002 | Bilborough et al. ...... 435/290.4 |
| 7,744,671 B1 * | 6/2010 | Ouellette ........................ 71/9 |
| 2003/0157702 A1 * | 8/2003 | Bard ....................... 435/290.4 |

* cited by examiner

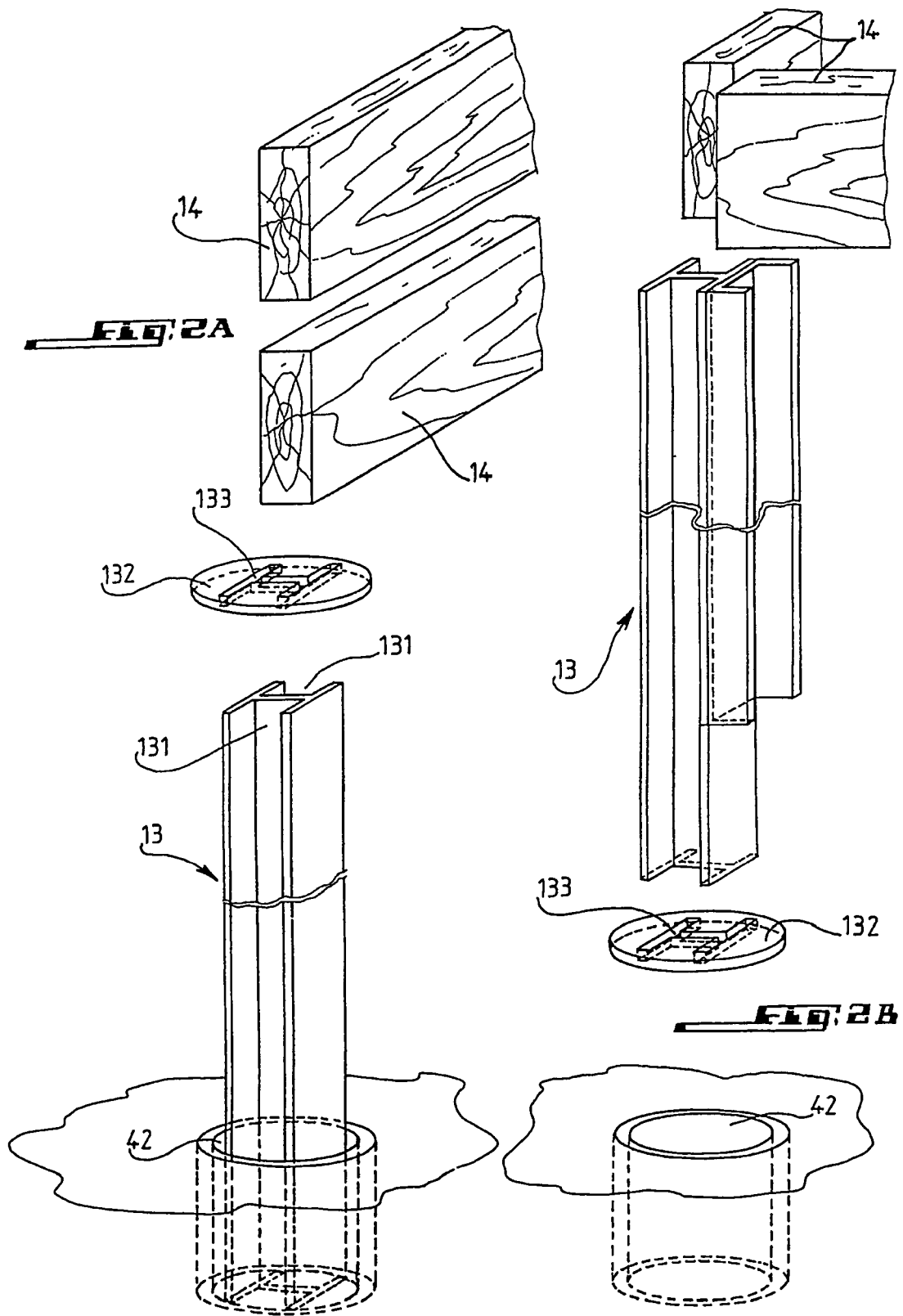

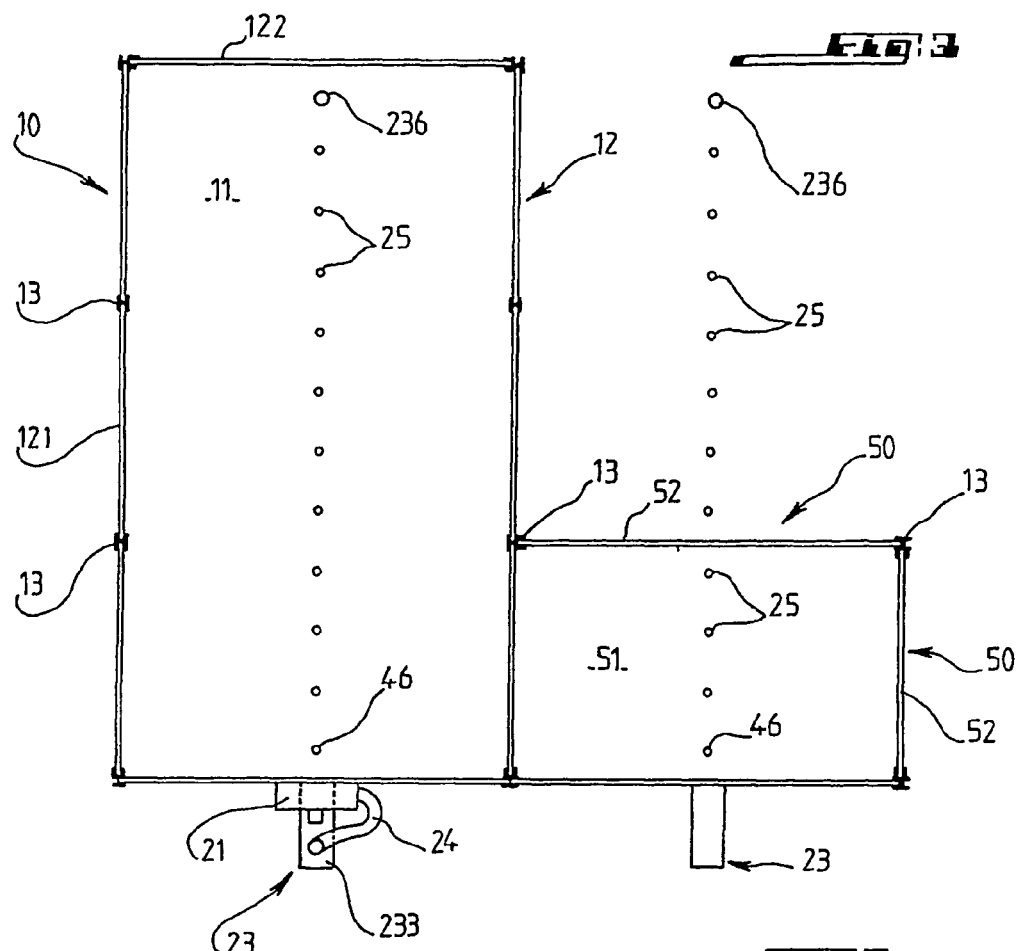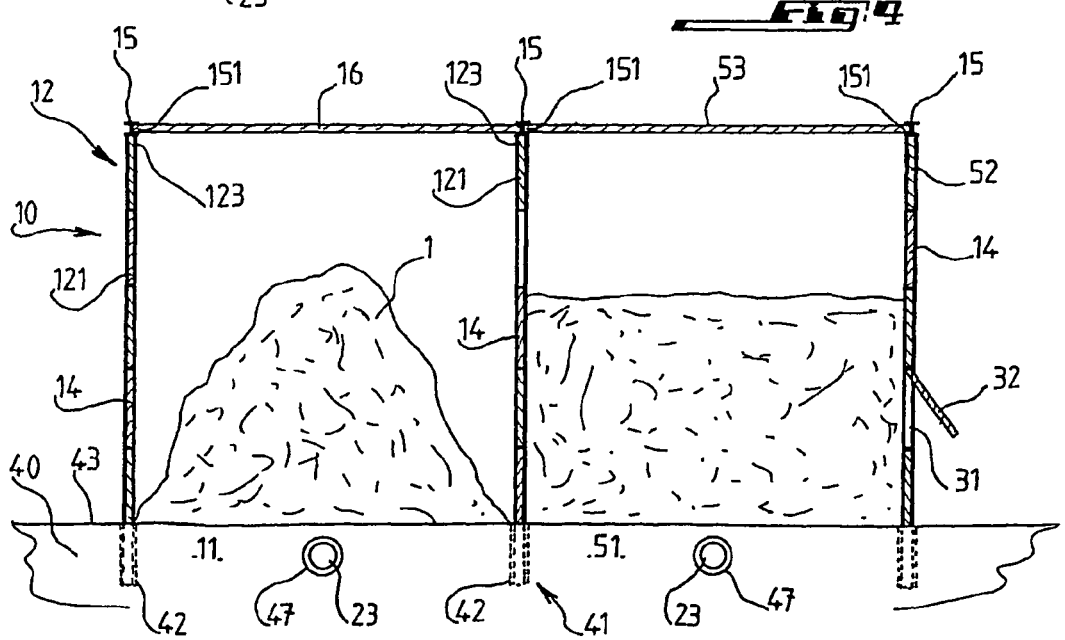

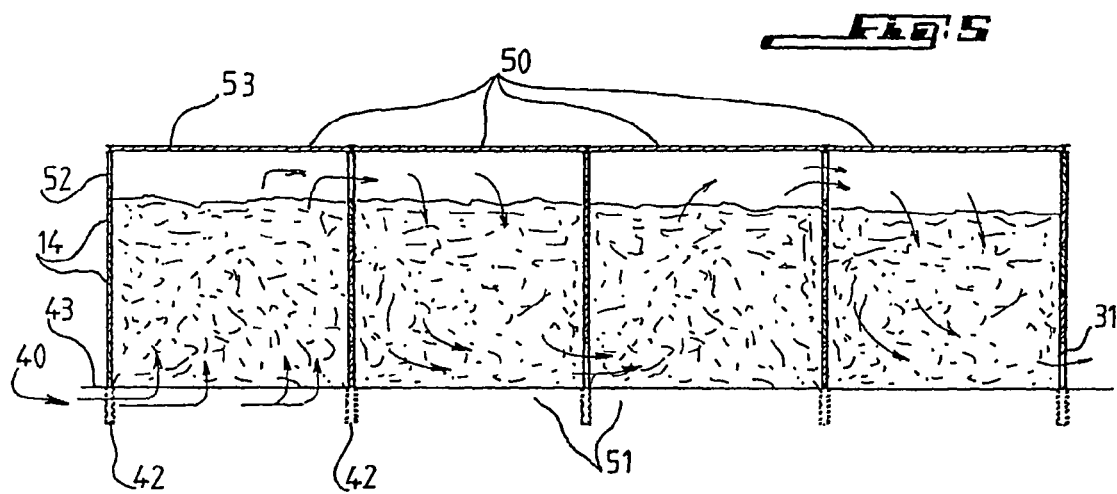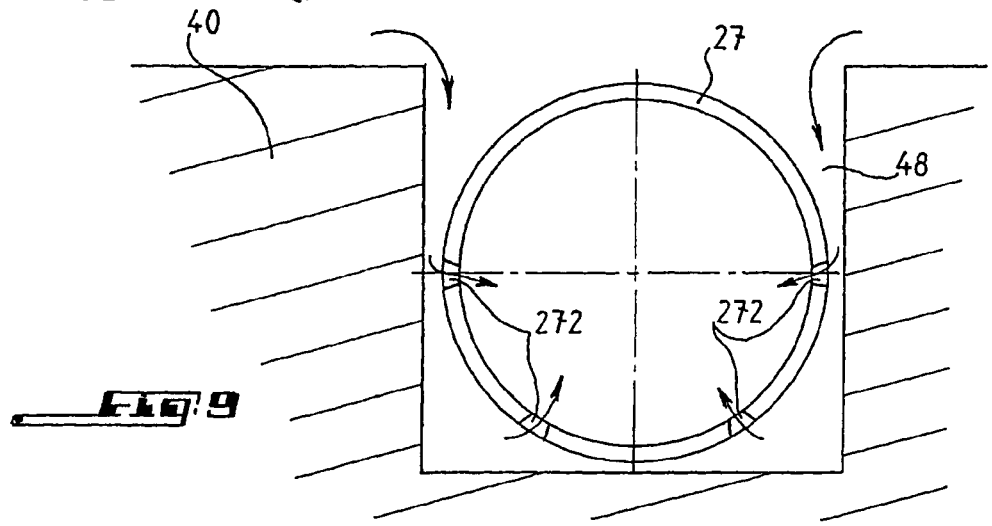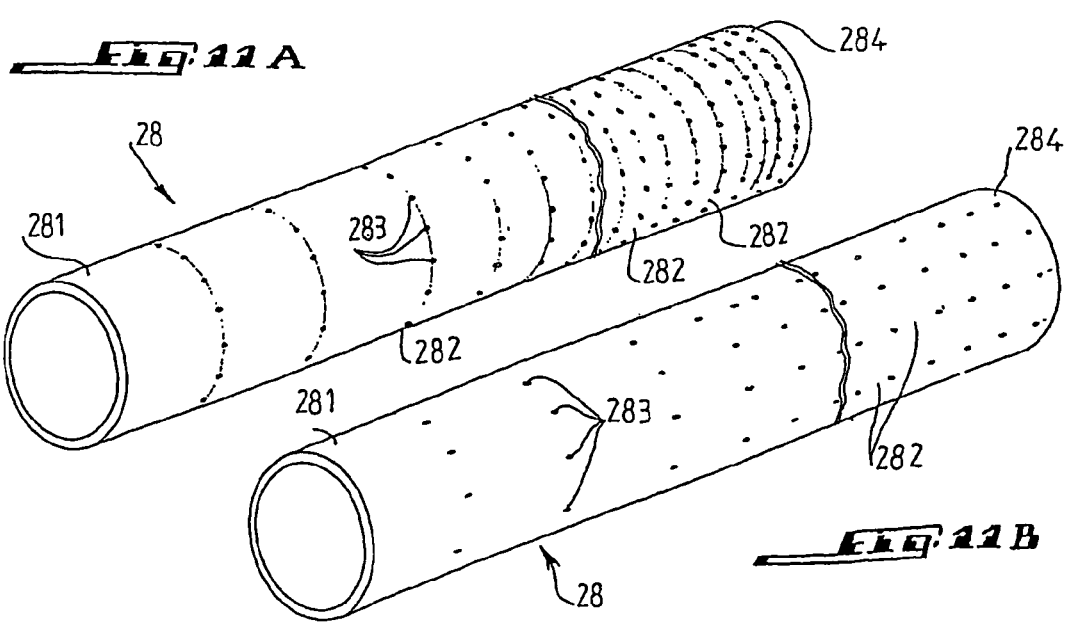

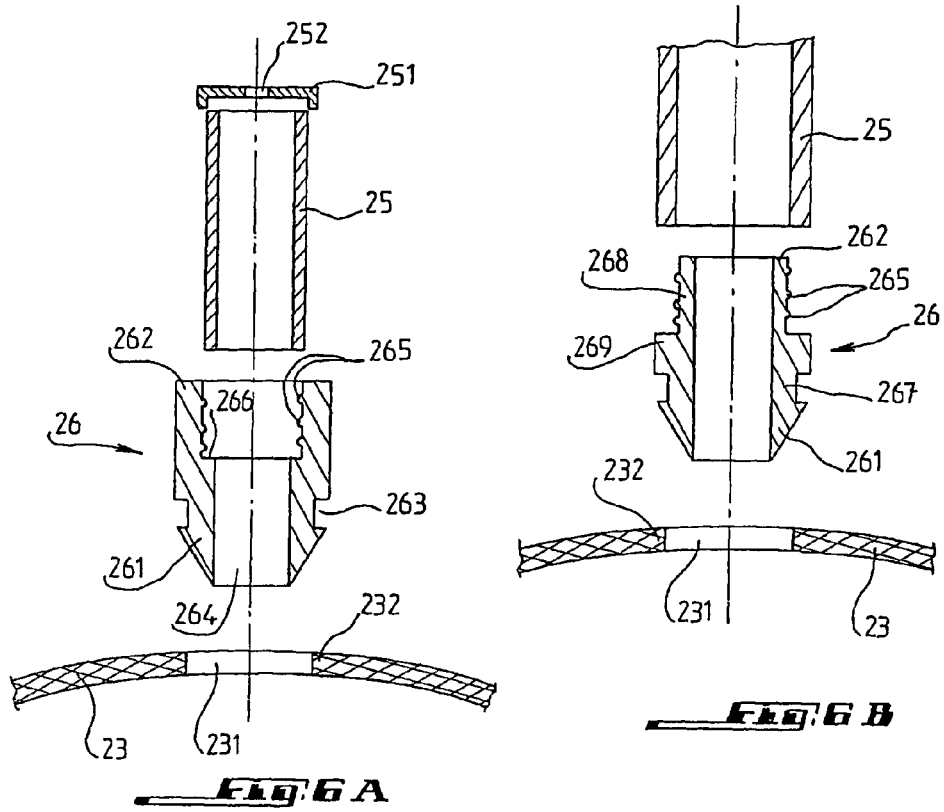
Fig. 6A
Fig. 6B
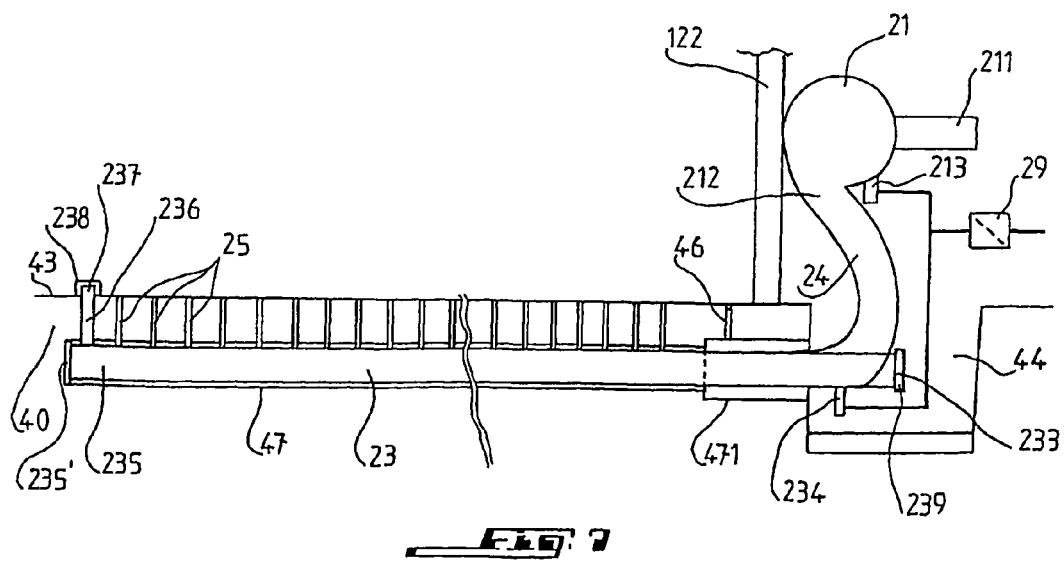
Fig. 7

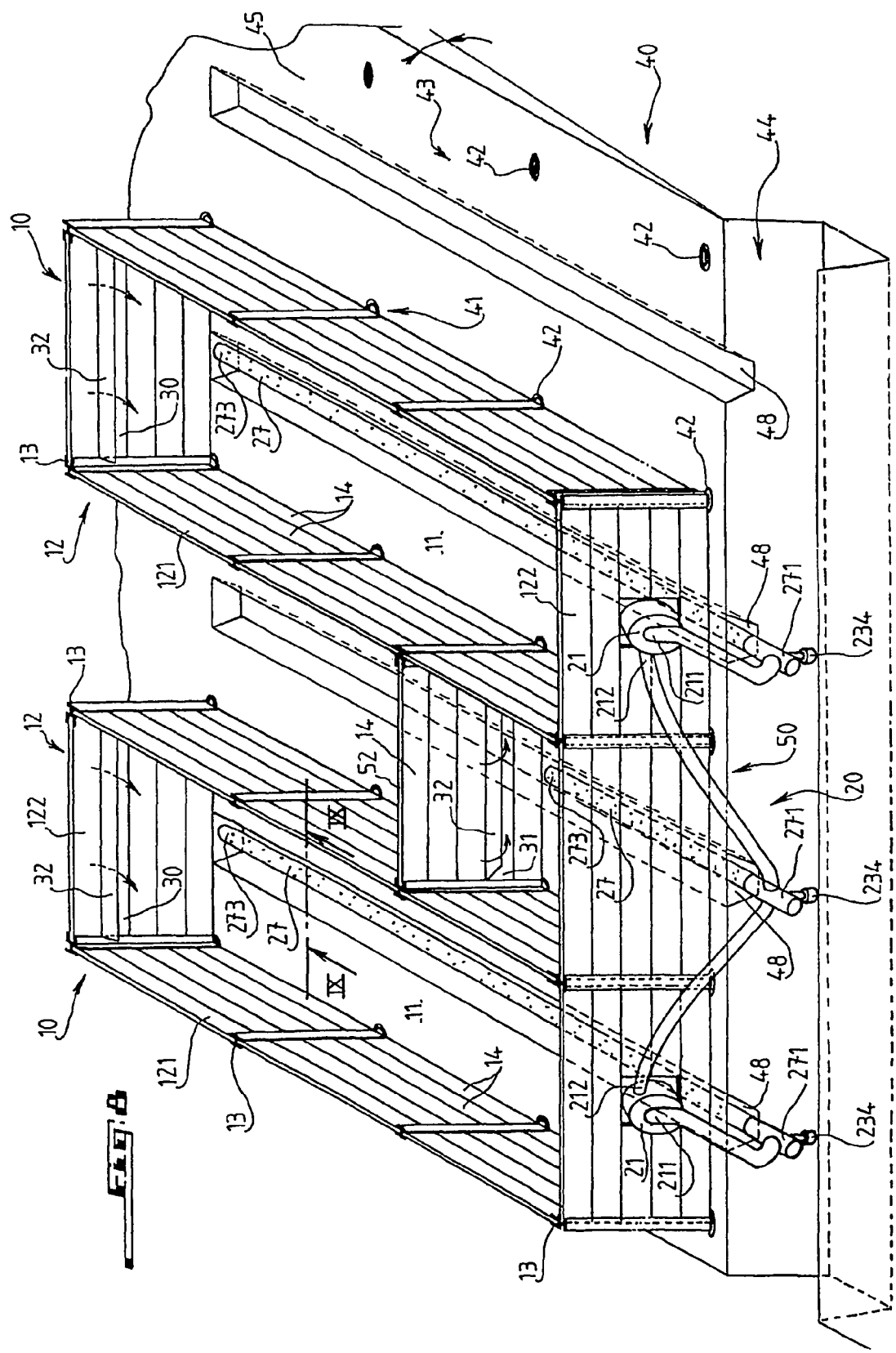

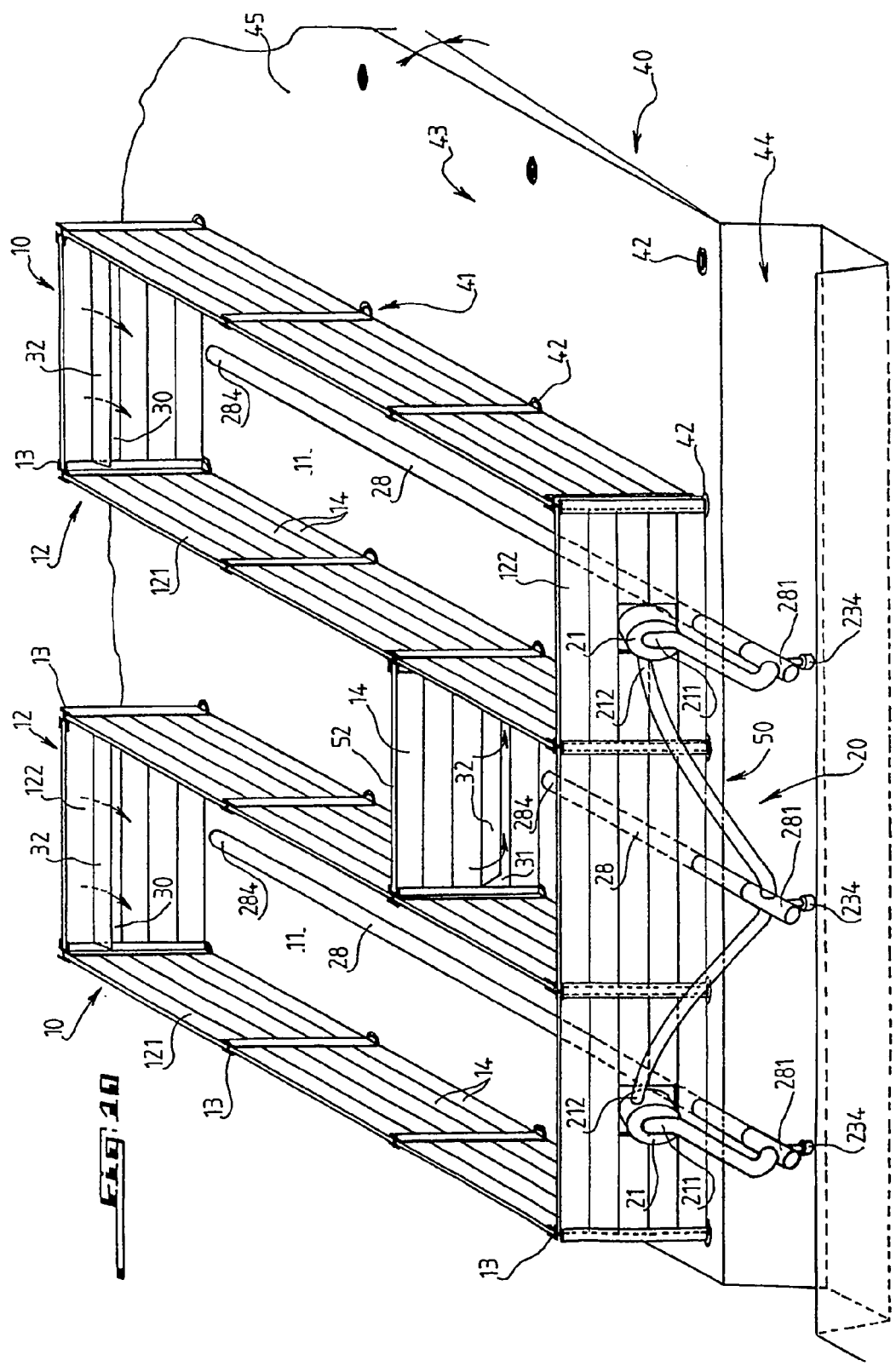

MODULAR INSTALLATION FOR COMPOSTING ORGANIC MATERIAL

CROSS REFERENCE TO RELATED APPLICATIONS

The present application is a national stage application filed under 35 U.S.C. §371, claiming the benefit of priority of International Application No. PCT/FR03/01382, filed May 2, 2003, which claims the benefit French Application No. 02/05582, filed May 3, 2002, all of which are herein incorporated by reference in their entirety.

The invention, in general, relates to installations for composting organic material.

More precisely, the invention relates to an installation for composting organic material, comprising an assembly of cells in which the organic material is stored for fermentation purposes and a ventilation device which blows or draws air through the organic material that is stored in the aforementioned cells, each cell comprising a base slab, partition walls and if necessary a roof, the ventilation device comprising at least one ventilating fan equipped with a suction port and a discharge port, and a ventilation duct which connects the suction port or the discharge port to one or more cells.

Installations of this type are known in the art, in particular in European patent application EP 0 451 184, which discloses a composting installation comprising four cells, arranged in two rows of two cells each. Each cell is provided with a concrete base slab and two concrete walls opposite each other and placed lengthwise. The base slabs of the four cells are independent of each other and are discontinuous. Perforated suction pipes are laid crosswise on the cell base slabs between the two opposite walls, under the organic material. These pipes are equally spaced and are set in place as the organic material is being loaded into the cells.

The cells of a same row are separated by a trough along which runs a header to which all the suction pipes are connected. This header is itself connected to the suction port of the ventilator fan.

Installations of the prior art have several important drawbacks which are detailed below.

The first drawback is that the nature of the organic material entering the facility may change in relation to the incoming waste and the operating contracts and authorizations obtained, and require a change in the operating organization or process of the installation, a change that is difficult to implement in installations of the prior art.

In addition, construction costs, determined to a great extent by the construction work, are high for facilities of the prior art.

The second drawback is that the insertion of poles secured directly to the apron prevents any change in the fermentation process.

The third drawback is that the installation's ventilation device is not optimized for existing ventilator fan and ventilation duct standards. This aspect is important as the efficiency of the composting process, and in particular the height of the material to be composted and the nature of the material and structuring agents to be mixed, is directly related to the efficiency of the ventilation.

The fourth drawback is that lixiviates are observed at the edge of the piles of organic matter, along the lengthwise walls of the cells. The presence of this lixiviate is a source of unpleasant odor and unaesthetic.

The fifth drawback is that the development of the technique of controlled ventilation had led to adopting solutions with buried ventilation ducts, consisting of a perforated and buried pipe to which are connected plastic airflow tubes for blowing or drawing in air through the waste. The airflow tubes are made in one piece and are directly inserted in or clipped to the airflow pipe. These tubes have the drawback of obligating the airflow equipment designers to have several injection molds in relation to the height of the airflow tubes desired or to trim down the tubes to a particular dimension at considerable cost.

And lastly, the sixth drawback is that, for the buried ventilation ducts functioning mainly by suction in the fermentation process, the recovery of the lixiviates flowing out of the airflow tubes into the buried duct necessitate the installation of airflow siphons for recovering these lixiviates and raises the cost of the construction work. These siphons store lixiviates continuously, which is an additional source of bad odor on the sites.

In this context, the purpose of this invention is to reduce the aforementioned drawbacks and to propose an installation based on a new concept, providing for flexible operation in relation to the material to be processed, eliminating the airflow siphons, and which is optimized costwise. In addition, this change in concept requires revamping the ventilation device, which at the same time provides the opportunity to eliminate certain defects found in designs of the prior art.

To this end, the installation corresponding to the invention, in conformity with the generic definition of it given by the preamble above, is characterized essentially by the fact that it comprises an apron forming the base slabs of the cells. This apron comprises the means for placing the cell walls at different predetermined positions. The size of the cells can consequently be modified in relation to needs.

In one embodiment of the invention, the means for positioning the cell walls comprise reserves made in the apron.

Advantageously, each partition wall can have several poles spread out along the wall as well as siding elements removably secured to these poles, the space between two adjacent poles being filled by the siding elements stretching between the said poles, the poles being removably inserted at their respective bottom ends, each one in a reserve in the apron.

Preferably, two adjacent poles belonging to the same wall can have respective lengthwise grooves opposite each other, the siding filling the space between the two adjacent poles having their opposite edges inserted in the two grooves facing each other.

For example, the cell can have two parallel and opposite walls each having an upper lengthwise edge, these opposite walls having lengthwise poles lying along their respective upper lengthwise edges, these lengthwise poles having respective lengthwise grooves opposite each other, roof elements being inserted, at opposite edges, in the grooves (facing each other) in the two lengthwise poles.

In one embodiment, each adjacent pole belonging to a same wall can have, at the top, additional lengthwise grooves perpendicular to the vertical grooves providing the means, owing to removable partitions, of closing the cells bounded by the horizontal side walls, and providing the means of forming a roof for closing the cell.

Preferably, the apron can comprise a trough and have a part slanted towards this trough, the apron also having several lixiviate drain ports spread out along the trough at the bottom of the said slanted part, these drain ports leading to the trough.

Advantageously, the reserves are arranged in several parallel rows perpendicular to the trough. The ventilation duct comprises perforated pipe runs lying in the median planes of the said parallel rows and slanted towards the respective first ends located in the trough. These first ends of the ventilation ducts are fitted with valves for draining the lixiviates.

Preferably, the ventilation component has a low point fitted with a valve for draining the condensates.

For example, the valves for draining the lixiviates and/or condensates can be diaphragm or sleeve valves actuated by a compressed air control system.

Advantageously, the control system for the lixiviate and condensate drain valves can be manual or automated and have in that case an electric valve having an open position in which the drain valves are supplied with compressed air and are in the closed position, and a closed position in which the drain valves are not supplied with compressed air and are in the open position, the electric valve going to the open position when the ventilation component is operating and going to the closed position when the ventilation component is not operating.

Advantageously, each perforated pipe run of the ventilation duct is embedded in the apron, the ventilation device having several airflow tubes each draining into the ventilation device, having a lower end in an opening in the perforated pipe run, and an upper end on the free side of the apron, and fasteners for clipping the airflow tubes onto the perforated pipe run, each clip-in fastener having the form of a tubular segment comprising at the first end a peripheral outer groove in which is engaged a peripheral edge of the opening into which the airflow tube drains, this tube being force-fitted to the second end of the clip-in fastener oppose the first end.

For example, the apron can have a tubular reserve in which lies the perforated pipe run of the ventilation duct, this tubular reserve allowing the passage of the ventilation ducts leading to the trough; this tubular reserve having at least one of the openings for removing the lixiviates by gravity leading directly to the tubular reserve and allowing the lixiviates to flow into the trough by gravity.

Preferably, the perforated pipe run of the ventilation duct can have a second end opposite the first end fitted with a tube leading to the free side of the apron at one end, this end being closed off with a screw-in or a removable plug, and adapted to be connected to a water-injection system for rinsing the perforated pipe run.

Preferably, the ventilation duct can have two opposite ends each fitted with a screw-in or removable plug and each without an airflow siphon, including the ventilation devices operating by suction.

For example, each perforated pipe run of the ventilation duct can be placed on the free side of the apron, its first end being connected to the suction port of the ventilation component, this perforated pipe run being perforated with several holes, the number of holes per unit of length of the perforated pipe run increasing gradually along the perforated pipe run, and being at a minimum at the first end and at a maximum at the second end of the said pipe run opposite the first end, or the holes being spread out over the periphery of pipe runs of the ventilation duct, the space between the pipe runs diminishing as the distance from the ventilation component increases.

Advantageously, the apron can have secondary troughs, each perforated pipe run of the ventilation duct stretching along a secondary trough, its first end being connected to the suction port of the ventilation component, each perforated pipe run having several sub-sections each perforated with holes spread out along the periphery of the said sub-section, the holes located in the lower half of a sub-section being greater in number and/or diameter than the holes located in the upper half of the said sub-section.

Preferably, the ventilation device can have an air intake coming from outside the facility, an air outlet to the outside of the facility, and one or more ventilation valves cutting off the air intake and/or the air outlet when the ventilation component is not operating and the cells are covered by a roof.

For example, the air blown or drawn through the organic material can go through a biological filter after leaving the cell, this biological filter consisting of a base slab composed of the apron and reserves, poles and walls of the same type as those of the cells.

In the absence of poles in the reserves, these can be closed off with plugs removably screwed into or clipped into the reserves.

Figure 2E:
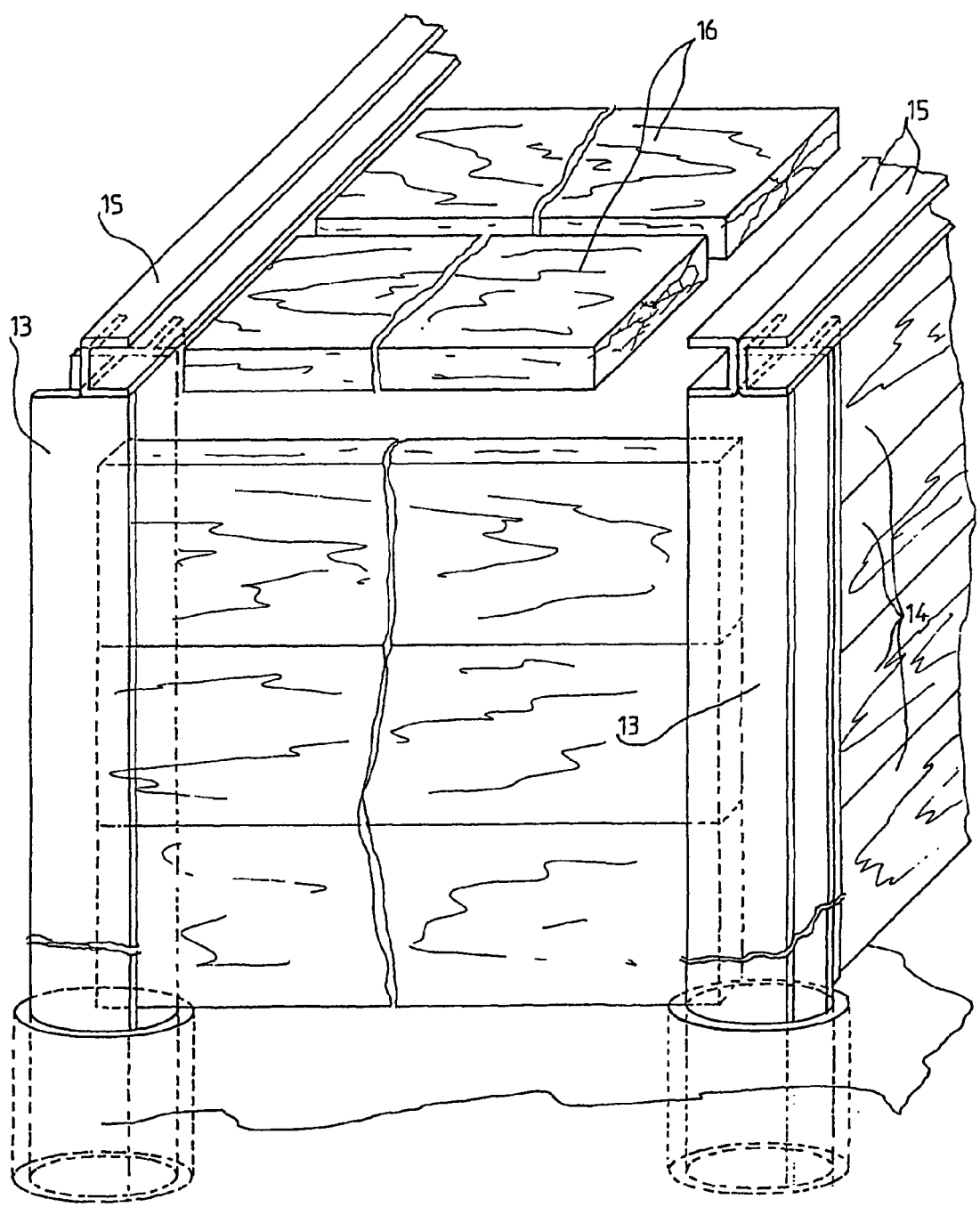

Other characteristics and advantages of the invention will be clearly understood from the description provided below, for information purposes and in no way limitative, with reference to the appended figures, in which:

FIG. 1 is a perspective view of two cells and a biological filter of a composting installation in accordance with a first embodiment of the invention, the cells and the filter being empty and their roofs not shown, FIGS. 2A and 2B are perspective views of the poles and siding elements constituting the cell walls in FIG. 1, FIG. 2C is a perspective view of the poles and siding elements used for closing the cells in FIG. 1 by means of a removable roof, FIG. 3 is a partial top view following arrow III in FIG. 1, FIG. 4 is a cross-sectional view in place IV-IV of FIG. 1, the cell and biological filter being filled, respectively, with organic material and filtering media, the roofs being shown, FIG. 5 is a cross-sectional view of another embodiment of the invention having several biological filters in series, FIG. 6A is a cross-sectional exploded view of an airflow tube clipped to the embedded pipe run of the ventilation duct by means of a clip-in fastener, FIG. 6B is a cross-sectional view of another embodiment of this clip-in fastener, FIG. 7 is a cross-sectional view in plane VII-VII of FIG. 1, FIG. 8 is a view similar to FIG. 1 of a second embodiment of the invention, FIG. 9 is a cross-sectional view in plane IX-IX of FIG. 8, FIG. 10 is a view similar to FIG. 1 of a second embodiment of the invention, and FIGS. 11A and 11B are perspective views of the perforated pipe of FIG. 10.

The installation for composting organic material 1 comprises an assembly of cells 10 in which the organic material 1 is stored for fermentation, and a ventilation device 20 which blows or draws air through the organic material 1 that is stored in the aforementioned cells 10.

The organic material to be processed belongs to three categories: vegetational waste, as for example grass cut when lawns are mowed, bio-waste, as for example fruits and vegetables, and mud.

The installation is comprised typically of four cells, but can have more or fewer of them depending on the composition of the incoming organic material and the process applied to it.

This process generally involves a succession of fermentation phases, each followed by an operation of sorting and orientation of the materials depending on their state at the end of the fermentation phase. The invention does not involve the installations for sorting and screening the organic material, which are consequently not described here. The fermentation phases are run in the various cells 10 of the facility.

Each cell 10 comprises a base slab 11, partition walls 12 and if necessary, a roof 16.

The ventilation device 20 comprises at least one ventilation component 21, typically a ventilator fan, fitted with an air suction port 211 and an air discharge port 212, and a ventilation duct 22 connecting the suction port 211 or the discharge port 212 to one or more cells 10.

The installation can therefore operate either by suction or by discharge.

In accordance with the invention, the installation comprises an apron 40 forming the base slabs 11 of the various cells 10, this apron 40 comprising means 41 for installing the partition walls 12 of the cells 10 at different predetermined positions. As a result, the size of the cells 10 can be modified according to needs.

It is therefore possible to recover the complete use of the base slab by removing the poles and siding or to change the number and size of the cells 10 while the installation is in operation. This provides the means of modifying the way in which the organic material is processed in relation to the composition of the incoming material and the quantities to be processed for each category of material.

As shown in FIG. 1, the means 41 for installing the partition walls 12 of the cells 10 comprise the reserves 42 made in the apron 40.

These reserves 42 are, preferably, arranged in several parallel rows lying lengthwise, the rows being equally spaced, and the reserves 42 in the same row also being equally spaced.

The reserves 42 are therefore made at the surface of the apron 40 so as to form the nodes of a rectangular array of squares.

As also seen in FIG. 1, each partition wall 12 has several poles 13 spread out along the wall 12, and siding elements 14 removably secured to these poles 13.

The space between two adjacent poles 13 of a partition wall 12 is filled over the entire height of the wall by siding elements 14 stretching between the said poles 13.

The poles 13 are removably inserted by the respective lower ends of each in a reserve 42 of the apron 40.

The cells 10 of the invention are rectangular in form, the longer dimension lying in the lengthwise direction, and are generally comprised of four straight partition walls 12, two parallel and opposite lengthwise walls 121 and two parallel and opposite crosswise walls 122. They can be fitted with a roof 16.

The poles 13 belonging to a same lengthwise wall 121 are inserted in reserves 42 in the same row. The poles 13 of a crosswise wall 122 are inserted in reserves 42 belonging to different rows.

As shown in FIGS. 2A, 2B, 2C and 3, the poles 13 have different forms depending on whether or not they are placed at an angle between two walls 12 or on whether they support a removable roof for closing a cell.

The poles 13 all comprise one or more grooves 131, these grooves 131 having identical U-shaped cross-sections.

The so-called mid-wall poles 13, i.e. those that are not placed at an angle, are metal I-shaped structural sections. They therefore have two parallel and opposite grooves 131 and two full opposite sides.

The angle poles 13 are each composed of an initial I-section identical to a mid-wall pole, and a second section secured firmly to the I-section.

This second section is a U-section, having the same shape and size as half of the I of the first section. This second section therefore has a lengthwise groove 131 on one side, and a full side opposite the groove. This full side is secured flat up against one of the two full sides of the first I-section, so that the angle pole 13 has three identical grooves 131, open on three different sides, two opposite sides and one side perpendicular to the other two sides.

The sections are secured to each other by simple means, such as welding or by means of bolts.

As shown in FIGS. 1 and 3, two adjacent poles 13 belonging to the same partition wall 12 have respective grooves 131 that are parallel and opposite each other. This is true whether the two poles are two mild-wall poles or a mid-wall pole and an angle pole.

The siding elements 14 filling the space between two adjacent poles 13 have their opposite edges removably inserted in the grooves 131 (facing each other) of the two poles 13.

These siding elements 14 are, for example, wooden boards, logs, strips of plastic, or cloth stretched over rigid frames.

If necessary, sealing between the siding elements and the ground is reinforced, for example, by making a seal with a sealing compound.

As shown in FIG. 2A, the reserves 42 are cylindrical in form and are clad with steel on the inside. Their diameter is such that the mid-wall poles 13 press against the four generatrices of the reserve 42, with the free edges of the four arms of the I.

It can be seen in FIG. 2B that the second structural sections of the angle poles do not go all the way down to the ends of these poles inserted in reserves 42. These said ends are consequently I-sections, able to be inserted in the reserve.

Each pole 13 is fitted with a collar 132 in the form of a disc, shown in FIGS. 2A and 2B, which covers reserve 42 in which the said pole is inserted. This collar has an opening 133 in the form of an I, whose size corresponds to the cross-section of the end of the poles 13. The ends of the poles 13 pass through these openings 133 when inserted in the reserves 42. The collars can be metal or plastic, and are attached to the poles 13. They are used to keep organic material or lixiviate from entering the reserve.

In the absence of poles 13 in the reserves 42, these can be covered over with plugs (not shown) removably secured in the reserves by being screwed in or clipped in.

The opposite lengthwise walls 121 of the cell 10 shown in FIG. 4 comprise lengthwise poles 15 lying along the respective upper lengthwise edges 123 of these walls.

These lengthwise poles 15 are identical to the mid-wall poles 13 and have an I-shaped cross-section, such that the lengthwise poles 15 on the two opposite lengthwise walls have respective lengthwise grooves 151 facing each other.

Roof elements 16 are inserted at opposite edges in the grooves 151 (facing each other) of the lengthwise poles 15 on the two lengthwise walls 121.

These roof elements 16 can be wooden boards, logs, or a tarpaulin that can be deployed or retracted manually or automatically.

The poles 13 and the lengthwise poles 15 have eyes drilled in them, used for lifting and moving these poles by means of lifting equipment.

As stated earlier, the facility can operate by suction or blowing.

In the first case, the air suction ventilation duct 22 is connected to the suction port 211 of the ventilator fan 21. Air from the outside enters the cell 10 through the top of the waste or, in the case where the cell is closed by a roof 16, through an air intake 30, passes through the organic material 1, is then collected by the ventilation duct 22, drawn in by the ventilator fan 21 and discharged to a biological filter 50, and comes out of the biological filter 50 and is expelled to the outside through an air outlet 31. The cell 10 and the biological filter 50 are respectively maintained in a state of vacuum and a state of overpressure with respect to the outside when the fan 21 is operating.

FIGS. 8 and 10 show two designs for the composting installation corresponding to the first case.

In the second case, by blowing in air under the pile of organic material, the ventilation duct 22 is connected to the discharge port 212 of the fan 21. Air from the outside is drawn in by the fan 21, discharged into the ventilation duct 22 then blown into the cell 10 under the organic material 1. The air passes through the latter, is then directed to the biological filter 50, and comes out of this biological filter 50 and is expelled to the outside through the air outlet 31. The cell 10 and the biological filter 50 are kept in a state of overpressure with respect to the outside when the fan 21 is operating.

FIG. 1 illustrates a first embodiment for the composting installation corresponding to the second case. The apron 40 has a trough 44 and a portion 45 slanted towards one edge of this trough 44, on which is placed one or more cells 10. Two fermentation cells and one bio-filter are shown in FIG. 1. The lengthwise walls 121 of these cells 10 are perpendicular to this trough 44. One of the two crosswise walls 122 of each cell 10 lies along the trough 44.

The facility can have several aprons 40 carrying the cells 10, associated with several troughs 44 if necessary.

It can for example have two aprons 40, placed on the two opposite sides of the trough 44 and both slanted towards this same trough 44.

The ventilation device 20 has at least one ventilator fan 21 per cell 10, this ventilator fan being secured to the crosswise wall 122 of the cell, alongside the trough 44. It is also possible to use the same fan for several cells 10 or for the fan not to be secured to a wall of the cell.

The ventilation device 20 also has several perforated pipe runs 23 of the ventilation duct 22 embedded in the slanted portion 45 of the apron 40. These perforated pipe runs 23 are parallel, and perpendicular to the trough 44, and lie in the median planes of the rows of reserves 42.

The ventilation fans 21 are each connected to one or more of these perforated pipe runs 23 by aboveground ventilation duct pipe runs 24.

Each perforated pipe run 23 is drilled with aligned holes 231, placed regularly approximately every twenty centimeters along the perforated pipe run 23 and placed on the top of it.

The ventilation device 20 also comprises several vertical airflow tubes 25 each terminating at its lower end in one of the holes 231 and at its upper end on a free face 43 of the apron 40, and fasteners 26 for clipping the airflow tubes 25 onto the perforated pipe run 23. The air discharged by the ventilator fan 21 into the perforated pipe run 23 is blown into the cell 10 through these airflow tubes. The airflow tubes 25 are approximately twenty centimeters long.

As shown in FIGS. 6A and 6B, each clip-in fastener 26 has the form of a tubular segment, comprising at a first end 261 an outer peripheral groove 263 in which is engaged a peripheral edge 232 of the opening 231 in which terminates the airflow tube 25, this airflow tube 25 being force-fitted to a second end 262 of the clip-in fastener 26 opposite the first one.

The first end 261 of the clip-in fastener 26 has a canted free edge, facilitating installation of the clip-in fastener in the opening 231.

The airflow tube 25 can be fitted inside the second end 262 of the clip-in fastener 26, as shown in FIG. 6A, or on the outside of this second end, as shown in FIG. 6B.

In the first case illustrated in FIG. 6A, the clip-in fastener 26 has an inside opening 264 shown in FIG. 6A, comprising a first tubular portion at the first end 261 whose size corresponds to the inside diameter of the airflow tube 25, and a second tubular portion larger than the first one, at the second end 262 of the clip-in fastener, this second portion forming a housing for accommodating the airflow tube 25. This second portion bears peripheral ribs 265 locking the airflow tube 25 in position when the latter is inserted in the clip-in fastener 26. It has an axial ring-shaped bottom 266 against which the airflow tube 25 abuts. This ring-shaped bottom 266 is perforated at the center by one end of the first tubular portion.

In the second case, illustrated in FIG. 6B, the clip-in fastener 26 has a first axial portion 267 at the first end 261, and a second axial portion 268 at the second end 262 whose outside diameter is smaller than that of the first axial portion and separated from the latter by a shoulder 269. The outside diameter of the second axial portion 268 corresponds to the inside diameter of the airflow tube 25. The second axial portion 268 bears peripheral ribs 265. The airflow tube 25 fits over the second axial portion 268 and abuts on the shoulder 269, the ribs 265 locking the airflow tube 25 in position.

Each airflow tube 25 carries at its end terminating on the free face 43 of the apron 40 a plug 251 having a hole 252 at its center. The plug is force-fitted to the end of the airflow tube.

Tests have shown that ventilation of the organic material is optimal when the following two conditions exist.

The area of the hole 231 must be greater than three times the area of the hole 252 in the plug 251.

It is also necessary for the right-angle cross-section of the perforated pipe run 23 to have an area greater than the sum of the areas of the holes 252 of all the airflow tubes 25 terminating in the said perforated pipe run. A uniform pressure can therefore be created when blowing air into the perforated pipe run, turning it into a pressure chamber, and obtaining identical air flows in all the airflow tubes.

This way of securing the airflow tubes to the perforated pipe run is particularly advantageous as it is quick and easy, and does not require having threads on the airflow tubes. In addition, it is very easy for the supplier of the airflow tubes to adapt them for length in relation to the thickness of the apron. The airflow tubes are in fact simple straight plastic tubes, than can be easily cut to the right dimensions.

As shown in FIG. 7, the apron 40 comprises tubular reserves 47 perpendicular to the trough 44 through which pass the ventilation lines 23, each tubular reserve 47 terminating in the trough 44 and being slanted towards the said trough.

The apron 40 also comprises a plurality of lixiviate drain holes 46 spread out along the trough 44, at the foot of the slanted portion 45 of the apron 40. More precisely, the apron comprises a gravity-type lixiviate drain hole 46 associated with each embedded pipe run 23 and tubular reserve 47, this drain hole being located at the end of the line formed by the ends of the airflow tubes 25 terminating at the free face 43 of the apron.

As shown in FIG. 1, there is in each cell 10 at least one drain hole 46, near the crosswise wall 122 carrying the ventilator fan 21, and located inside the cell.

These drain holes 46 terminate in a flared end 471 of the tubular reserve 47 in which lies the ventilation line 23 associated with the said tubular reserve.

The drain hole 46 can be made of an airflow tube 25 of the type described above, the airflow tube 25 adapted to be clipped into the said tubular reserve 47 using the same clip-in systems 26 employed for the airflow tubes 25.

The lixiviate resulting from fermentation of the organic material thus flows towards the foot of the apron's slant and flows out of the drain hole, first into the tubular reserve 47, then into the trough 44 by means of this lixiviate tube 46.

In addition, each perforated pipe run 23 is slanted towards a first end 233, this first end being located in the trough 44 and fitted with a lixiviate drain valve 234 and a screw-type, or removable plug 239.

In this way the lixiviates that flow through the tubes 25 into the perforated airflow pipes accumulate at the first end 233 and can be recovered an removed.

In addition, each ventilator fan 21 has a low point having a condensate drain valve 213.

Preferably, the lixiviate and condensate drain valves 234 and 213 are diaphragm or sleeve valves, manually-operated or actuated by a compressed air control system.

The automatic system for actuating the diaphragm or sleeve valves has an electric valve 29 for each fan 21. This electric valve 29 actuates the condensate drain valve 213 of the fan 21 and the lixiviate drain valve(s) 234 of the perforated pipe run(s) associated with the fan 21. The electric valve 29 can be in an open position in which the lixiviate and condensate drain valves 234 and 213 are supplied with compressed air and are in the closed position, and a closed position in which the lixiviate and condensate drain valves 234 and 213 are not supplied with compressed air and are in the open position.

The electric valve 29 goes to its open position when the fan 21 is operating and to its closed position when the fan 21 is not operating. The lixiviate and condensate drain valves 234 and 213 can be, for example, connected to a liquid pumping system for automatically removing the lixiviates and condensates. This pumping system can be pneumatic.

Each perforated pipe run 23 has a second end 235 opposite the first end 233, fitted with a tube 236 terminating at the free face 43 of the apron with a threaded end 237. A cap 238 is removably screwed onto this threaded end 237. This cap 238 can be removed and the tube 236 can be connected to a water injection system for rinsing the perforated pipe run.

The embedded pipe run 23 is closed off at its second end 235 with a leak-tight plug 235'.

In this way, neither of the ends 233 and 235 has a siphon due to the presence of the valves 213- and 234 for recovery of the lixiviates and condensates.

The air blown through the organic material 1, after leaving the cell 10, passes through the biological filter 50.

This biological filter 50 is made in the same way as the cells 10, and consists of a base slab 51 composed of the apron 40, reserves 42 and partition walls 52 and, as an option, a roof 53 of the same types as those of the cells 10 with their roof 16. The space so bounded is partially filled with a mixture of turf, compost, bark and other absorbent material, forming the filtering media.

Preferably, the cells 10 have a common wall with the biological filter 50, air flowing from each cell to the filter through an opening, made very easily by removing a siding element 14 from the common wall.

It is possible in this way to make economical, multi-stage bio-filtration arrangements by placing side by side on the apron several biological filters 50 built as described above, as shown in FIG. 5.

The cells 10 and the filters 50 have in this case common walls.

Concerning the filters 50 having common walls in this manner, outlets are created by removing a siding element 14 from each common wall, the air passing from one filter to the other through the space occupied by the siding elements that were removed.

The air inlet and outlet of the same filter are located one at the bottom of a wall and the other at the top of a wall, so as to force the air to pass through the filtering media.

If necessary, it is possible to add to the ventilation system an additional air-deodorizing stage, like a first bubbling stage using a suitable solution and/or a second molecule-trapping stage for smelly molecules, just before or just after the biological filter or in one or more biological filters.

In this first embodiment, the air intakes are the suction ports 211 of the ventilator fans 21, and the air outlets 31 are created by removing a siding element 14 from a wall 52 of each biological filter.

A second embodiment of the invention will now be described. It corresponds to a composting installation operating by suction. Only the aspects that differ from the installation operating by blowing will be described, elements that are identical or have the same function in both cases keeping the same reference numbers.

In a first variant shown in FIG. 8, the apron 40 comprises several secondary, mutually-parallel troughs 48 lying perpendicular to the trough 44, each terminating in the latter at respective ends.

These secondary troughs 48 lie in median planes formed by the rows of reserves 42. Each cell 10 is consequently traversed by at least one secondary trough 48.

The ventilation device 20 has for each cell 10 of the installation at least one ventilation duct perforated pipe run 27 lying in the secondary trough 48 traversing the cell 10, this perforated pipe run having a first end 271 connected to the suction port 211 of a ventilator fan 21 and a second blocked end 273 opposite the first end.

Each perforated pipe run 27 has several perforated cross-sections, each perforated with holes 272 spread out along the periphery of the said cross-section.

The holes 272 located in the lower half of a perforated cross-section are more numerous and/or are greater in diameter than the holes 272 located in the upper half of the said cross-section, as shown in FIG. 9.

This characteristic improves ventilation of the organic material, the holes in the lower half being less likely to be covered over and clogged by organic material than the holes in the upper half.

In a second variant shown in FIG. 10, the apron does not have secondary troughs, and the ventilation device 20 has for each cell 10 a ventilation duct perforated pipe run 28 laid directly on the free face of the apron and lying practically in the same position as the perforated pipe run corresponding to the first variant.

As described previously, this perforated pipe run 28 has a first end 281 connected to the suction port 211 of a ventilator fan 21 and a second blocked end 284 opposite the first end.

This perforated pipe run 28 has several cross-sections 282 perforated with holes 283, the number of holes 283 per unit of length of the perforated pipe run increasing gradually along the perforated pipe run 28, being at a minimum at the first end 281 and at a maximum at the second end 284, or, for the same number of holes per cross-section, the space between cross-sections diminishing as the second end 284 is approached.

This characteristic provides the means of having holes of the same diameter regardless of the length of the ventilation line and have a drawn-in air flow per unit of length that is identical all along the pipe run, independent of the distance from the inlet of the perforated pipe run.

In this second design, the air inlets 30 are created by removing a siding element 14 from a partition wall 12 of each cell 10, and the air outlets are created by removing a siding element from a partition wall 52 of each biological filter 50.

Air is blown into each biological filter 50 through a perforated pipe of the same type as those used for suction in the cells 10.

In this design with air entering the fermentation cells or air leaving the bio-filters through the openings in the walls, it is obvious that these fermentation cells or bio-filter cells must have a roof 16 compelling the air that is drawn in or blown to pass through the air supply or air exhaust hatch.

If there are no openings in the cell walls, the cells are in that case installed without the roofs and the air is drawn in directly from the outside.

It can be noted that in all the designs the insertion of sleeve or diaphragm valves for manual or automated recovery of the lixiviates provides the means of eliminating the airflow siphons at each end of the airflow lines.

The lixiviate drain holes 46, in the second design, terminate directly in the trough 44. They are not shown in FIGS. 8 and 10. The lixiviates pass in fact under the siding of the walls 122 or through the reserves 48.

It can be noted that in both designs described above, and of course when the cells are covered over by a roof, with the installation operating by blowing and with the installation operating by suction, the ventilation device 20 comprises ventilation flaps 32 covering over the air inlet(s) 30 and the air outlet(s) 31 when the fan(s) are turned off, preventing the air from escaping when the cells are placed in a state of over-pressure or vacuum.

For the air inlets and outlets 30 and 31 created by removing a siding element from a wall, the flaps 32 are simple pivoting flaps mounted on the walls.

These flaps 32 open and close under the effect of the difference in pressure between the inside of the cells and filters and the outside.

These flaps prevent odors from spreading out around the installation while it is shut down.

Lastly, it is important to emphasize that the installation described above provides the means of making cells of different sizes and different forms able to contain different types of fermentation or bio-filtration material and lying in different positions with respect to the trough 44, and providing the means, at the proper time, of recovering the full use if necessary of the base slab because of being able to remove all or part of the equipment, poles and removable siding installed.

It is also important to emphasize that any platform equipped in accordance with the principles of the invention can be supplied in the form of a mounting unit composed, firstly, of the reserves 42 and the siding poles, which can be directly supplied to companies doing work on roads and utility networks, and that it is possible, aside from the base slab, to avoid the costly use of concrete.

And lastly, it is pointed out that the invention also provides the means, with the same equipment, of designing both fermentation cells and bio-filters and being able to place these items of equipment side by side, systematically reducing the number of partition walls.

The invention claimed is:

1. An installation for composting organic material (1), wherein said installation comprises:
    an assembly of cells (10) in which said organic material (1) is stored for fermentation, wherein each one of said cells (10) comprises a base slab (11) and partition walls (12);
    an apron (40) which forms said base slab (11) of each of said cells (10), wherein said apron (40) comprises means (41) for installing said partition walls (12) of said cells (10) at different predetermined positions, wherein said means (41) allows the size of said cells (10) to be modified in relation to needs and comprises reserves (42) made in said apron (40); and
    a ventilation device (20) blowing or drawing in air through said organic material (1) stored in said cells (10),
    wherein each of said partition walls (12) comprises:
        poles (13) which are spread out along said partition wall (12), wherein the lower end of each of said poles (13) is removably engaged in one said reserve (42) of said apron (40), and
        siding elements (14) which are removably secured to said poles (13), wherein space between two adjacent said poles (13) is filled by said siding elements (14) which stretch between said poles (13);
    wherein said ventilation device (20) comprises:
        at least one ventilation means (21), wherein said at least one means (21) is fitted with a suction port (211) and a discharge port (212), and
        a ventilation duct (22), wherein said duct (22) connects said suction port (211) or said discharge port (212) to one or more of said cells (10);
    wherein said apron (40) has a trough (44) and a portion (45) slanted towards said trough (44),
    wherein said apron also has several lixiviate drain holes (46) which are spread out along said trough (44) at the foot of said portion (45) and that terminate in said trough (44),
    wherein said reserves (42) are arranged in several parallel rows which are parallel to each other and perpendicular to said trough (44),
    wherein said ventilation duct (22) has perforated pipe runs (23, 27, 28) that lie in the median planes of said more than one parallel rows, and are slanted towards respective first ends (233, 271, 281) located in said trough (44), wherein said first ends (233, 271, 281) are fitted with lixiviate drain valves (234),
    wherein each of said perforated pipe runs (23) of said ventilation duct (22) is embedded in said apron (40), and
    wherein said ventilation device (20) further comprises:
        several airflow tubes (25), wherein each terminates at its lower end in an opening (231) in said perforated pipe run (23) and each terminates at its upper end on a free face (43) of said apron (40); and,
        clip-in fasteners (26) for clipping said airflow tubes (25) into said perforated pipe run (23), wherein one of said clip-in fasteners (26) has the form of a tubular segment having at a first end (261) an outer peripheral groove (262) in which is inserted a peripheral edge (232) of said opening (231) in which said airflow tube (25) terminates, said airflow tube (25) being force-fitted to a second end (262) of said clip-in fastener (26) opposite said first end (261).

2. The installation of claim 1, wherein each of two adjacent said poles belonging to the same said wall (12) comprises lengthwise grooves (131) facing each other, wherein said siding elements (14) which fill said space between two adjacent said poles (13) have opposite edges inserted in the two said lengthwise grooves (131) facing each other.

3. The installation of claim 1, wherein said cell (10) has:
    two said walls (12) which are parallel and opposite to each other, wherein each of the two said walls (12) has
    an upper lengthwise edge (123), and
    lengthwise poles (15) lying along the respective said upper lengthwise edges (123), wherein said lengthwise poles (15) have respective lengthwise grooves (151) facing each other; and
    roof elements (16) which are inserted at opposite edges in said lengthwise grooves (151) of said lengthwise poles (15) of said walls (12).

4. The installation of claim 1, wherein said ventilation means (21) has a low point fitted with a condensate drain valve (213).

5. The installation of claim 1, wherein
said ventilation means has a low point fitted with a condensation valve (213); and,
said lixiviate valves (234) and said condensate drain valve (213) are diaphragm or sleeve valves actuated by a compressed air control system.

6. The installation of claim 5, wherein said control system has an electric valve (29), which is in open position when said ventilation means (21) is operating and which is in closed position, and a closed position in which the drain valves (234, 213) when said ventilation means (21) is not operating, wherein
in said open position of said valve (29), said valves (234) and (213) are supplied with compressed air and are in closed position,; and,
in said closed position of said valve (29), said valves (234) and (213) are not supplied with compressed air and are in open position.

7. The installation of claim 1, wherein said ventilation duct perforated pipe run (23, 27, 28) has two opposite ends (233, 235, 271, 273, 281, 284) which are each fitted with a screw-in or removable plug and each are not fitted with an airflow siphon, including the case of ventilation devices operating by suction.

8. The installation of claim 1, wherein said apron (40) has a tubular reserve (47) traversed by said ventilation duct (22), wherein said tubular reserve (47) terminates directly in said trough (44) and at least one of said lixiviate gravity drain holes (46) terminates directly in said tubular reserve (47).

9. The installation of claim 1, wherein each of said perforated pipe runs (23) of said ventilation duct (22) has a second end (235), opposite said first end, fitted with a tube (236) terminating at a free face (43) of said apron (40) at said first end (237), wherein said first end (237) is closed by a removable or screw-on cap (238) and adapted to be connected to a water injection system for rinsing out said perforated pipe run (23), a second end (233) being itself fitted with a screw-in or removable plug (239).

10. The installation of claim 1, wherein each of said perforated pipe runs (28) of said ventilation duct (22) is laid on the surface of said apron (40), wherein said first end (281) of said pipe runs (28) is connected to said suction port (211) of said ventilation means (21), wherein said perforated pipe run (28) is perforated with several holes (283), the number of said holes (283) per unit of length of said perforated pipe run (28) increasing gradually along said perforated pipe run (28), being at a minimum at said first end (281) and at the maximum at a second end (284) of the said pipe run opposite said first end.

11. The installation of claim 1, wherein each of said perforated pipe run (28) of said ventilation duct (22) is laid on the surface of said apron (40), its first end (281) being connected to said suction port (211) of the ventilation means (21), wherein each of said perforated pipe run (28) has several cross-sections (282) perforated with holes (283), wherein the spacing between said cross-sections with said holes (283) diminishes gradually along said perforated pipe run (28) diminishing gradually along the perforated pipe run (28) and is at a minimum at said second end (284) of said pipe run opposite said first end.

12. The installation of claim 1, wherein:
said apron (40) has secondary troughs (48);
each of said perforated pipe runs (27) of said ventilation duct (22) lies along one of said secondary trough (48) and has several cross-sections, each perforated with holes (272) spread out along the periphery of said cross-section, wherein said holes (272) located in the lower half of said cross-section being greater in number and/or greater in diameter than said holes (272) located in the upper half of said cross-section; and,
said first end (271) of said ventilation duct (22) is connected to said suction port (211) of said ventilation means (21).

13. The installation of claim 1, wherein said air blown or drawn in through said organic material (1) passes through a biological filter (50) after coming out of said cell (10), wherein said biological filter (50) comprises a base slab (51) composed of said apron (40), said reserves (42), said partition walls (52) and said removable poles (13) of the same type as those of said cells (10).

14. The installation of claim 1, wherein each of said reserves (42) can be covered over with a removable screw-in or clip-in plug.

15. An installation for composting organic material (1), wherein said installation comprises:
an assembly of cells (10) in which said organic material (1) is stored for fermentation, wherein each one of said cells (10) comprises a base slab (11) and partition walls (12);
an apron (40) which forms said base slab (11) of each of said cells (10), wherein said apron (40) comprises means (41) for installing said partition walls (12) of said cells (10) at different predetermined positions, wherein said means (41) allows the size of said cells (10) to be modified in relation to needs and comprises reserves (42) made in said apron (40); and
a ventilation device (20) blowing or drawing in air through said organic material (1) stored in said cells (10),
wherein each of said partition walls (12) comprises:
poles (13) which are spread out along said partition wall (12), wherein the lower end of each of said poles (13) is removably engaged in one said reserve (42) of said apron (40), and
siding elements (14) which are removably secured to said poles (13), wherein space between two adjacent said poles (13) is filled by said siding elements (14) which stretch between said poles (13);
wherein said ventilation device (20) comprises:
at least one ventilation means (21) fitted with a suction port (211) and a discharge port (212), and
a ventilation duct (22) that connects said suction port (211) or said discharge port (212) to one or more of said cells (10),
wherein said apron (40) has a trough (44) and a portion (45) slanted towards said trough (44),
wherein said apron also has several lixiviate drain holes (46) which are spread out along said trough (44) at the foot of said portion (45), and
wherein said drain holes (46) terminate in said trough (44).

16. The installation of claim 15, wherein
said reserves (42) are arranged in several parallel rows which are parallel to each other and perpendicular to said trough (44); and,
said ventilation duct (22) has perforated pipe runs (23, 27, 28) that lie in the median planes of said more than one parallel rows, and are slanted towards the respective first ends (233, 271, 281) located in said trough (44), wherein said first ends (233, 271, 281) are fitted with lixiviate drain valves (234).

17. The installation of claim 16, wherein:
each of said perforated pipe runs (23) of said ventilation duct (22) is embedded in said apron (40); and,
said ventilation device (20) comprises:
several airflow tubes (25), wherein each terminates at its lower end in an opening (231) in said perforated pipe run

(23) and each terminates at its upper end on a free face (43) of said apron (40); and, clip-in fasteners (26) for clipping said airflow tubes (25) into said perforated pipe run (23), wherein one of said clip-in fasteners (26) has the form of a tubular segment having at a first end (261) an outer peripheral groove (262) in which is inserted a peripheral edge (232) of said opening (231) in which said airflow tube (25) terminates, said airflow tube (25) being force-fitted to a second end (262) of said clip-in fastener (26) opposite said first end (261).

18. An installation for composting organic material (1), wherein said installation comprises:

an assembly of cells (10) in which said organic material (1) is stored for fermentation, wherein each one of said cells (10) comprises a base slab (11) and partition walls (12);

an apron (40) which forms said base slab (11) of each of said cells (10), wherein said apron (40) comprises means (41) for installing said partition walls (12) of said cells (10) at different predetermined positions, wherein said means (41) allows the size of said cells (10) to be modified in relation to needs and comprises reserves (42) made in said apron (40); and a ventilation device (20) blowing or drawing in air through said organic material (1) stored in said cells (10), wherein each of said partition walls (12) comprises:

poles (13) which are spread out along said partition wall (12), wherein the lower end of each of said poles (13) is removably engaged in one said reserve (42) of said apron (40), and siding elements (14) which are removably secured to said poles (13), wherein space between two adjacent said poles (13) is filled by said siding elements (14) which stretch between said poles (13); wherein said ventilation device (20) comprises:

at least one ventilation means (21) fitted with a suction port (211) and a discharge port (212), a ventilation duct (22) that connects said suction port (211) or said discharge port (212) to one or more of said cells (10), an inlet (30) for air coming from the outside of said installation, an outlet (31) for air going to the outside of said installation, and one or more ventilation flaps (32) covering over said air inlet (30) and/or said air outlet (31) when said ventilation means (21) is turned off.

* * * * *